May 12, 1925.  N. M. HERRERA  1,537,443
SPRING WHEEL
Filed March 6, 1922
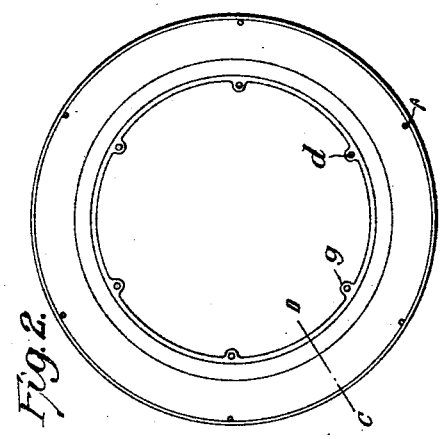
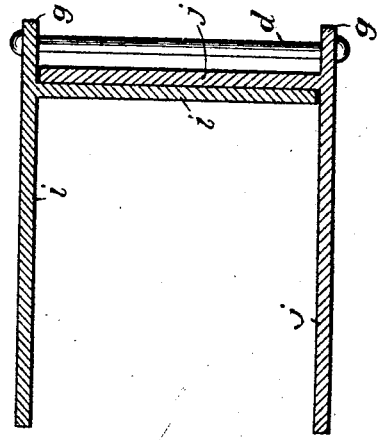
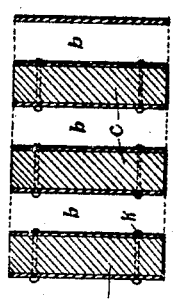
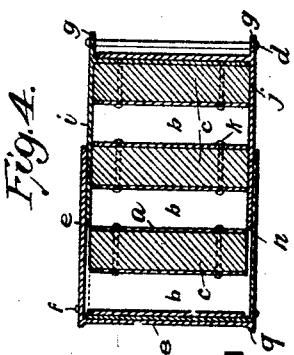
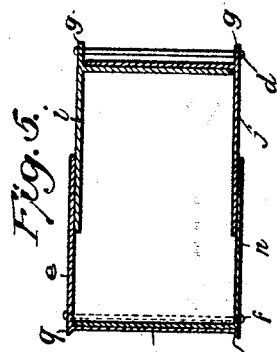
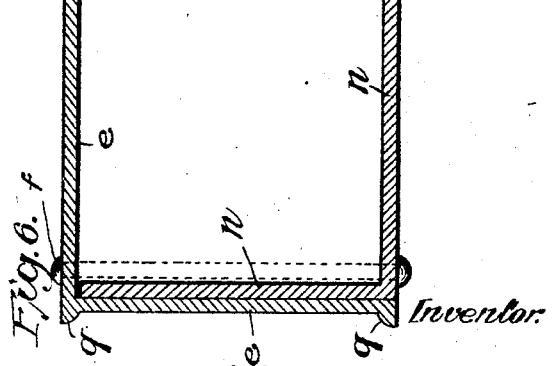
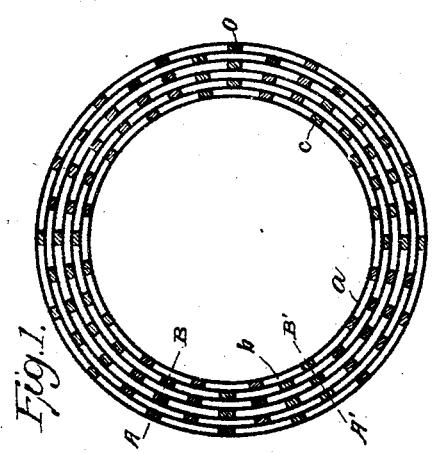
Inventor.
N.M. Herrera
by Lawrence Langner
Atty.

Patented May 12, 1925.

1,537,443

UNITED STATES PATENT OFFICE.

NICOLAS M. HERRERA, OF BUENOS AIRES, ARGENTINA.

SPRING WHEEL.

Application filed March 6, 1922. Serial No. 541,522.

*To all whom it may concern:*

Be it known that NICOLAS MARIANO HERRERA, residing at Buenos Aires, Argentine Republic, has invented new and useful Improvements in Spring Wheels, of which the following is a specification.

This invention relates to an improved metallic resilient tire capable of replacing the pneumatic tires in use at present, and adapted to all classes of wheels.

For a better understanding of this invention, reference may be had to the accompanying drawings, in which:

Fig. 1 is a front view of the elastic portion.

Fig. 2 is an external front view of the cases or covers.

Fig. 3 is a section through the elastic portion shown in Fig. 1.

Fig. 4 is a section of the cases with the elastic portion.

Fig. 5 is a section through the cases of Fig. 2.

Fig. 6 is a section through the external case shown in Fig. 2, and

Fig. 7 is a section through the inner casing shown in Fig. 2.

Like characters of reference indicate similar parts throughout the drawings.

The tire of this invention consists of two principal parts, which are, as shown in the drawings, the inner or elastic portion (Figs. 1 and 3), and the outer portion which protects and reinforces the elastic portion (Figs. 2 and 5) the first named portion serving the purposes of the pneumatic tube, while the other serves as the usual cover employed at present.

The elastic portion is constituted by a series of cylindrical concentric metallic hoops $a$ (Figs. 1 and 3) spaced a distance $b$, from each other, and united to each other by means of alternately positioned spacers $c$.

The number of hoops $a$, their thickness, and the number and dimensions of spacers $c$, as also the size of spaces $b$ (Figs. 1 and 3) are all variable factors, since they are the factors which give elasticity to the tire, the desired elasticity varying, of course, with the load to be supported.

The hoops $a$ (Figs. 1 and 3) may be of steel or any other material of good elasticity. The alternate spacers $c$ which unite the hoops may be of wood, leather, vulcanite, steel or other materials, and are secured to the hoops by means of rivets or bolts $h$, autogenous soldering being employed, if desired, when metallic hoops are employed.

Figs. 1 and 3 clearly show the elastic portion with the arrangement of the aforesaid hoops $a$, spaces $b$, and spacers $c$.

This elastic portion of the tire is enclosed within two metallic cases or covers which protect and reinforce it, as shown in Figs. 2 and 5, the arrangement of elements being as described below.

Said cover consists of two cylindrical concentric metallic cases, of different heights, (Figs. 2 and 5) which are partially telescoped into each other, and which may have a certain amount of relative movement in the direction of their telescopic fit.

The outer case is open on the inner side (Figs. 2, 5 and 6), and receives herein the inner case. The outer case is formed of two half cases $n$, $e$ (Figs. 4, 5 and 6), secured to each other by bolts $f$.

These bolts $f$, besides connecting the half cases $n$ and $e$, pass through openings $o$, Fig. 1, in the corresponding spacers when the elastic portion is placed in the case, whereby the elastic portion is held against slipping on the case.

The half case $e$, on the part which contacts with the ground, has, at each edge, a flange $q$, (Figs. 4, 5 and 6), these flanges serving to hold a rubber band on the tire so as to avoid the noise produced by the tire on passing over the ground.

Of course, when the tire is used in the country, the rubber band and flange $q$ may be omitted.

The inner case is similar to the outer case, but is open on the outer side, (Figs. 2, 5 and 7) and is socketed in the external case.

This case is also formed like the former, of two half cases $i$, $j$, (Figs. 4, 5 and 7) connected to each other by means of bolts $d$ which pass through lugs $g$, (Figs. 2, 4, 5 and 7). These bolts $d$ and lugs $g$, besides connecting both inner half cases, serve the purpose of securing the tire to the bed of the wheel.

Within the aforesaid cases is enclosed the elastic portion of the tire (Fig. 4), and once this is accomplished the wheel is ready to be used and presents the form shown in Fig. 2.

Since the elastic portion is of variable dimensions, it will be evident that the cases or cover which protect it will also be of variable dimensions.

The operation is similar to that of pneumatic tires, since when in motion, when it meets an obstacle the elastic portion gives way and the cases slide one within the other until the obstacle is passed, after which they assume their original position.

The maximum deformation of the tire depends on the thickness of spacers $c$ and the number of hoops $a$ (Figs. 1, 3 and 4), and these elements will be chosen according to the type of vehicle to which the tire is applied.

It is evident the various changes in construction and details may be made without departing from the scope of the invention, the essential characteristics of which are clearly set forth in the appended claim.

Having thus fully described and ascertained the nature and scope of my invention and the manner in which it is to be carried out, what I claim as new and desire to protect by Letters Patent of the United States of America, is:

A metallic elastic tire, comprising two cylindrical concentric telescoping cases of different heights, each being formed by two right angled members connected together by bolts, a series of cylindrical concentric equidistant hoops connected to each other by means of alternately placed spacers and bolts contained in the telescoping cases, the cylindrical hoops being connected to the casings by means of certain of said first mentioned bolts passing through certain of said spacers.

In testimony whereof he affixes his signature in presence of two witnesses.

NICOLAS M. HERRERA.

Witnesses:
M. MATHER,
BETRES ZSO.